United States Patent
Brandemuehl et al.

(10) Patent No.: US 9,695,896 B2
(45) Date of Patent: Jul. 4, 2017

(54) DRIVE AND ASSOCIATED METHOD

(71) Applicant: Regal Beloit America, Inc., Beloit, WI (US)

(72) Inventors: Robert Leslie Brandemuehl, Waukesha, WI (US); Scott Ernest Filzen, Janesville, WI (US); Sarah Josephine Weir, Milwaukee, WI (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/588,587

(22) Filed: Jan. 2, 2015

(65) Prior Publication Data

US 2015/0203134 A1    Jul. 23, 2015

Related U.S. Application Data

(60) Provisional application No. 61/929,648, filed on Jan. 21, 2014.

(51) Int. Cl.
| | |
|---|---|
| *B60K 17/36* | (2006.01) |
| *B60K 1/02* | (2006.01) |
| *B60T 1/06* | (2006.01) |
| *F16D 65/18* | (2006.01) |
| *F16D 121/04* | (2012.01) |
| *F16D 125/36* | (2012.01) |
| *F16D 125/66* | (2012.01) |

(52) U.S. Cl.
CPC ............. *F16D 65/18* (2013.01); *B60K 1/02* (2013.01); *B60K 17/36* (2013.01); *B60T 1/062* (2013.01); *F16D 2121/04* (2013.01); *F16D 2125/36* (2013.01); *F16D 2125/66* (2013.01)

(58) Field of Classification Search
CPC .. B60K 17/36; B60K 1/02; B60K 5/08; B60T 1/06; B60T 1/062
USPC .............................. 180/6.48, 6.5, 24.12, 337
See application file for complete search history.

(56) References Cited

U.S. PATENT DOCUMENTS

| | | | |
|---|---|---|---|
| 2,642,144 A * | 6/1953 | Brewer, Jr. ............ | B60K 17/34 180/24.06 |
| 3,198,551 A * | 8/1965 | Garner ................. | B60K 17/342 180/22 |
| 3,262,513 A | 7/1966 | Henriksson | |

(Continued)

FOREIGN PATENT DOCUMENTS

| | | |
|---|---|---|
| CN | 201721323 U | 1/2011 |
| CN | 102627238 A | 8/2012 |
| CN | 202657142 U | 1/2013 |

*Primary Examiner* — Keith J Frisby
(74) *Attorney, Agent, or Firm* — John Wagley

(57) ABSTRACT

A motorized vehicle has a plurality of left wheels and right wheels. The vehicle includes a first motor adapted for powering at least two of the plurality of left wheels and a second motor adapted for powering at least two of the plurality of right wheels. The vehicle also includes a first power transferring device for transferring power from the first motor to a left wheel, a second power transferring device for transferring power from the second motor to a right wheel, a third power transferring device for transferring power from the first left wheel to a second left wheel, and a fourth power transferring device for transferring power from the first right wheel to a second right wheel. The vehicle also includes a first braking mechanism for the first of the left wheels and a second braking mechanism for the second of the left wheels.

6 Claims, 14 Drawing Sheets

(56) References Cited

U.S. PATENT DOCUMENTS

| | | | | |
|---|---|---|---|---|
| 3,435,798 A * | 4/1969 | Rieli | ............... | B60F 3/00 180/54.1 |
| 3,799,362 A * | 3/1974 | Oswald | ............... | B60K 17/36 180/24.11 |
| 4,407,381 A * | 10/1983 | Oswald | ............... | B60K 17/342 180/24.12 |
| 4,458,772 A * | 7/1984 | Oswald | ............... | E02F 9/02 180/6.2 |
| 4,562,893 A * | 1/1986 | Cunard | ............... | B60K 1/02 180/22 |
| 5,156,230 A | 10/1992 | Washburn | | |
| 5,409,250 A * | 4/1995 | Csotonyi | ............... | A61G 5/042 180/6.2 |
| 5,429,543 A * | 7/1995 | Tilbor | ............... | A63H 17/36 180/22 |
| 5,609,510 A * | 3/1997 | Stubenfoll | ............... | A63H 17/26 446/437 |
| 5,752,871 A * | 5/1998 | Tsuzuki | ............... | A63H 17/262 180/209 |
| 6,446,742 B1 * | 9/2002 | Wilson | ............... | A61G 5/046 180/65.6 |
| 7,128,175 B1 * | 10/2006 | Martineau | ............... | B60F 3/0007 180/22 |
| 7,201,244 B2 | 4/2007 | Johnston | | |
| 7,267,409 B2 | 9/2007 | Feuereisen | | |
| 7,318,580 B2 | 1/2008 | Johnston | | |
| 7,493,992 B2 | 2/2009 | Rogers | | |
| 8,113,125 B2 | 2/2012 | Hepner et al. | | |
| 8,578,861 B2 | 11/2013 | Hepner et al. | | |
| 2011/0035139 A1 | 2/2011 | Konlditsiotis et al. | | |
| 2012/0234121 A1 | 9/2012 | Jensen et al. | | |

\* cited by examiner

DRIVE AND ASSOCIATED METHOD

CROSS REFERENCE TO RELATED APPLICATION

This application is a non-provisional application and claims priority to U.S. Provisional Patent Application 61/929,648 filed Jan. 21, 2014 for "DRIVE AND ASSOCIATED METHOD", which is hereby incorporated by reference in its entirety.

BACKGROUND OF THE INVENTION

The embodiments described herein relate generally to a drive mechanism for a vehicle, and more specifically, to an apparatus and method associated with a speed reducing device for use with a drive motor to provide a drive mechanism for a vehicle.

Various types of drive mechanisms are used to rotate a variety of wheels and or tracks to advance a vehicle for a variety of applications. Such applications include material transport, mining, excavation and mass transit and the drive mechanisms may include braking mechanisms.

One common application is a mining car. Typically the mining car includes a plurality of wheels, with one or more wheels driven by the drive mechanism. One typical mining car has four wheels with each wheel being driven. Typically a four wheel mining car has a first motor, typically an electric motor, positioned on the left side of the car and a second motor, typically an electric motor, positioned on the right side of the car. Each of the electric motors propels the wheels on the respective right and left sides of the car.

Typically the electric motors rotate at much higher rotational speed than the wheels necessitating a first gear reduction box adjacent the motor, a second gear reduction box adjacent the wheel and a third gear reduction box between the second gear box and the wheel To provide braking to the car, typically the car includes a separate brake adjacent the motor, between the first gear reduction box and the second gear reduction box to stop the front and rear, right or left wheels. The brake must be of sufficient strength to stop both the front and rear wheels.

The environment in which the mining car is used provides challenges to the durability of the car. In particular mining dust tends to migrate through seals into the gears and bearings of the gear reduction boxes. Further, the repair of the mining car typically requires expensive disassembly of the car and its components. Further components are large and expensive to fabricate and difficult to disassemble and replace. Further many large, expensive and complex components and assemblies must be manufactured and stored adjacent the mining site so that repairs can be quickly made.

The present invention is directed to alleviate at least some of these problems with the prior art.

BRIEF DESCRIPTION OF THE INVENTION

According to an embodiment of the present invention a motorized vehicle having a plurality of left wheels and a right wheel is provided. The vehicle includes a first motor adapted for powering at least two of the plurality of left wheels. The vehicle also includes a first power transferring device for transferring power from the first motor to a first of the plurality of left wheels and a second power transferring device for transferring power from the first of the plurality of left wheels to a second of the plurality of left wheels. The vehicle also includes a first braking mechanism operably associated with the first of the plurality of left wheels and a second braking mechanism operably associated with the second of the plurality of left wheels.

According to an aspect of the present invention, the motorized vehicle further includes a second right wheel and a second motor adapted for powering at the first right wheel and the second right wheel. The vehicle also includes a third power transferring device for transferring power from the second motor to the first right wheel and a fourth power transferring device for transferring power from the first right wheel to the second right wheel. The vehicle also includes a third braking mechanism operably associated with the first right wheel and a fourth braking mechanism operably associated with the second right wheel.

According to an aspect of the present invention, the first braking mechanism is positioned between the second power transferring device and the first of the plurality of left wheels.

According to another aspect of the present invention, the vehicle also includes a first speed reduction device positioned between the first power transferring device and the first of the plurality of left wheels and a second speed reduction device positioned between the first speed reduction device and the first of the plurality of left wheels.

According to yet another aspect of the present invention, the first braking mechanism is positioned between the first speed reduction device and the second speed reduction device.

According to yet another aspect of the present invention, the first braking mechanism is positioned between the second speed reduction device and the first of the plurality of left wheels.

According to another embodiment of the present invention, a motorized vehicle having a plurality of left wheels and a right wheel is provided. The vehicle includes a first speed reduction device operably associated with a first of the plurality of left wheels, a second speed reduction device positioned between the first speed reduction device and the first of the plurality of left wheels, a first sump operably associated with the first speed reduction device, and a second sump operably associated with the second speed reduction device.

According to yet another embodiment of the present invention, a motorized vehicle having a plurality of left wheels and a right wheel is provided. The vehicle includes a first speed reduction device operably associated with a first of the plurality of left wheels. The speed reduction device includes a housing, an adapter mounted to the housing, and a crown gear. The crown gear is mounted to the adapter.

According to a further embodiment of the present invention, a motorized vehicle having a plurality of left wheels and a right wheel is provided. The vehicle includes a first speed reduction device. The first speed reduction device has a plurality of components adapted to provide a first configuration adapted for cooperation with at least one of the plurality of left wheels and adapted to provide a second configuration adapted for cooperation with the right wheel.

According to yet another embodiment of the present invention a motorized vehicle having a plurality of left wheels and a right wheel is provided. The vehicle includes a first speed reduction device operably associated with a first of the plurality of left wheels, a second speed reduction device positioned between the first speed reduction device and the first of the plurality of left wheels and a connector for connecting the first speed reduction device to the second speed reduction device.

According to an aspect of the present invention, the motorized vehicle further includes a boot seal operably connected to at least one of the first speed reduction device and second speed reduction device for sealing the connector.

According to an aspect of the present invention, the motorized vehicle further includes a kingpin operably connected to the first speed reduction device and/or the second speed reduction device. The first speed reduction device and/or the second speed reduction device define a cavity for receiving at least a portion of the kingpin. The cavity defines a chamber for containing a fluid for assisting in moving the kingpin from an engaged position to a disengaged position.

According to yet an embodiment of the present invention, a method for powering a motorized vehicle is provided. The vehicle has a plurality of left wheels and at least one right wheel. The method includes the step of providing a first motor adapted for powering at least two of the plurality of left wheels and the step of providing a first power transferring device for transferring power from the first motor to a first of the plurality of left wheels. The method further includes the step of providing a second power transferring device for transferring power from the first of the plurality of left wheels to a second of the plurality of left wheels and the step of providing a first braking mechanism operably associated with the first of the plurality of left wheels. The method further includes the step of providing a second braking mechanism operably associated with the second of the plurality of left wheels.

According to an aspect of the present invention, the method further includes the steps of providing a first right wheel, providing a second right wheel and providing a second motor adapted for powering the first right wheel and the second right wheel. The method further includes the step of providing a third power transferring device for transferring power from the second motor to a first of the plurality of right wheels and the step of providing a fourth power transferring device for transferring power from the first of the plurality of right wheels to a second of the plurality of right wheels.

DETAILED DESCRIPTION OF THE INVENTION

Due to increased customer and industry demands, reduced noise and vibration, lower costs, and improved performance in capacity and efficiency are desirable in the design and manufacture of fluid moving devices powered by electric motors. The methods, systems, and apparatus described herein facilitate reduced noise and vibration, lower costs, and improved performance in capacity and efficiency for an electric machine. This disclosure provides designs and methods to reduce noise and vibration, lower costs, and improved performance in capacity and efficiency. This disclosure further provides designs and methods to reduce noise and vibration, lower costs, and improved performance in capacity and efficiency.

Technical effects of the methods, systems, and apparatus described herein include at least one of improved performance and quality and reduced labor costs.

Figure 1:
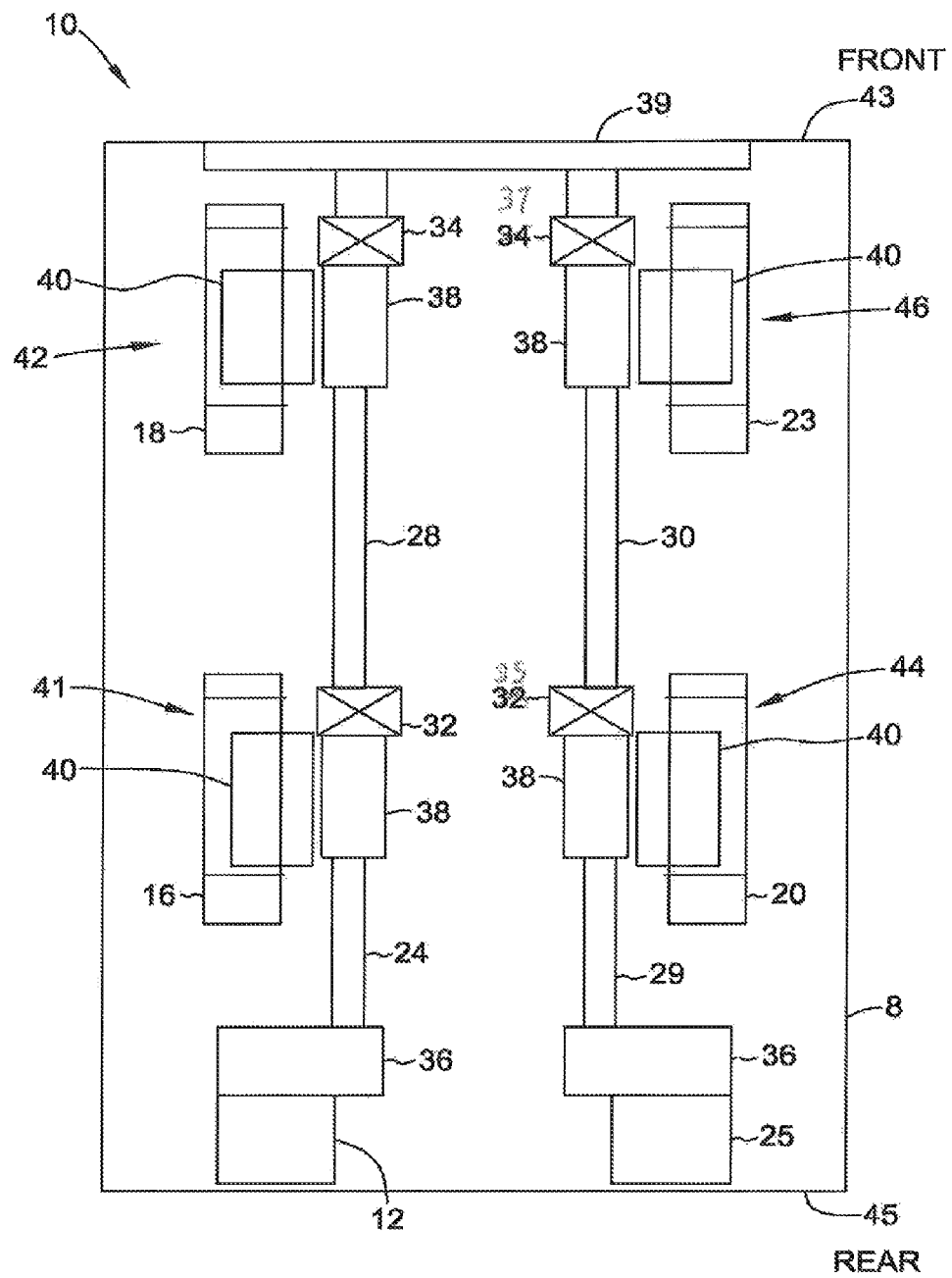
FIG. 1 is a top view of an embodiment of the present invention in the form of a motorized vehicle including separate braking mechanisms on the front and rear wheels.

According to an embodiment of the present invention and referring now to FIG. 1, a motorized vehicle 10 is shown. The vehicle 10 includes first motor 12 which provides the mechanical force to propel the vehicle 10. The motor is secured to frame 8. The vehicle 10 includes a first left wheel 16 and a second left wheel 18. The vehicle 10 also includes a first right wheel 20. The first motor 12 is adapted for powering the first left wheel 16 and the second left wheel 18.

The vehicle 10 also includes a first power transferring device 24 for transferring power from the first motor 12 to the first left wheel 16. The vehicle also includes a second power transferring device 28 for transferring power from the first motor 12 to the second left wheel 18. The vehicle 10 also includes a first braking mechanism 32 operably associated with the first left wheel 16 and a second braking mechanism 34 operably associated with the second left wheel 18.

According to an aspect of the present invention, the motorized vehicle 10 may further include a second right wheel 23 and a second motor 25 adapted for powering the first right wheel 20 and the second right wheel 23. The vehicle 10 may also include a third power transferring device 29 for transferring power from the second motor 25 to the first right wheel 20 and a fourth power transferring device 30 for transferring power from the first right wheel 20 to the second right wheel 23. The vehicle also includes a third braking mechanism 35 operably associated with the first right wheel 20 and a fourth braking mechanism 37 operably associated with the second right wheel 23.

The second motor 25 is adapted for powering the first right wheel 20 and the second right wheel 23.

The first motor 12 and the second motor 25 may be similar to each other or identical to each other. The first motor 12 and the second motor 25 may be any motors capable of providing sufficient reliable torque to the vehicle 10 to propel it. The first motor 12 and the second motor 25 may be, for example an internal combustion engine or an electric motor. If the motors are electric motors, the motors may be, for example, induction motors, permanent magnet motors, electronically commutated motors or switched reluctance motors and may be A/C or D/C motors. The electric motors may be powered by an electric source (not shown) which may be provided by an external power line (not shown) or by an onboard electric generator (not shown) powered by an internal combustion engine (not shown).

The power transferring devices 24, 28, 29 and 30 may be any devices capable of transmitting torque from the motors toward the wheels. For example, the power transferring devices may be shafts, pulleys, belts or gears. For simplicity and as shown in FIG. 1, the power transferring devices are shafts. The shafts may be rigidly connected to the mating components or may include flexible connections, for example, constant velocity joints.

Associating the first braking mechanism 32 with the first left wheel 16 and the second braking mechanism 34 with the second left wheel 18, provides for improved safety for the vehicle and permits the use of smaller braking mechanisms in that more braking mechanisms share the braking force load. It should be appreciated that the first braking mechanism 32 may be positioned anywhere in the power train of the vehicle 10 between the first power transfer device 24 and the first wheel 16. Placing the braking mechanism as close to the wheel as possible maximizes safety, while placing the braking mechanism closer to the first power transfer device, reduces the amount of torque the braking mechanism must overcome.

The placement of the first braking mechanism 32 between the first left wheel 16 and the first power transfer device 24, as shown in FIG. 1, minimizes the amount of torque the first braking mechanism 32 must overcome. Similarly, the placement of the second braking mechanism 34 between the second left wheel 18 and the second power transfer device 28, as shown in FIG. 1, minimizes the amount of torque the second braking mechanism 34 must overcome.

The first motor 12 is adapted for powering the first left wheel 16 and the second left wheel 18. The second motor 25 is adapted for powering the first right wheel 20 and the second right wheel 23.

Typically the motors 10 and 12 rotate at speeds far different than the desired speeds of the wheels 16, 18, 20 and 23. Typically, for off-highway vehicles, particularly mining vehicles, the motors rotate at speeds far in excess of the speeds of the wheels. To provide the desired wheel speed, the vehicle 10 is equipped with speed reduction devices to lower the rotation speed of the wheels below that of the motors. While the speed reduction may be performed with one speed reduction device per motor, due to the extent of the speed reduction required for off-highway vehicles and the high torque loads of such vehicles, multiple speed reduction devices are typically used for each motor.

Typically and as shown in FIG. 1, the vehicle 10, when equipped as a mining vehicle, may be used to remove material, for example ore or coal, from a deposit in the earth. One such mining vehicle is a continuous miner 10. When so equipped the continuous miner 10 may include excavating or loading device 39, such as a cutter head 39. The cutter head 39 engages the seam of coal and is positioned on FRONT 43 of vehicle 10, opposed to the REAR 45 of vehicle 10.

For example and as shown in FIG. 1, the vehicle 10 includes a first speed reduction device 36 positioned between the first motor 12 and the first power transfer device 24. The first speed reduction device 36 may, for example, be a gearbox, a chain and sprocket mechanism or a pulley and belt mechanism. For example, the first speed reduction device 36 may, for example, be a bevel gearbox, a spur gearbox, or a planetary gearbox. It should be appreciated that additional speed reduction devices (not shown) may be positioned between the first motor 12 and the first power transfer device 24.

For example and as shown in FIG. 1, the vehicle 10 includes a second speed reduction device 38. The second speed reduction device 38, as shown in FIG. 1, may be positioned between the first power transfer device 24 and the first wheel 16. For example, the second speed reduction device 38 may, for example, be a bevel gearbox, a spur gearbox, or a planetary gearbox.

For example and as shown in FIG. 1, the vehicle 10 includes a third speed reduction device 40. The third speed reduction device 40, as shown in FIG. 1, may be positioned between the second speed reduction device 38 and the first wheel 16. For example, the third speed reduction device 38 may, for example, be a bevel gearbox, a spur gearbox, or a planetary gearbox.

For simplicity and as shown in FIG. 1, the vehicle 10 may include additional speed reduction devices that are similar or identical to other speed reduction devices. For example and as shown in FIG. 1, another first speed reduction device 36 may be positioned between the second motor 25 and the second power transfer device 29. For example and as shown in FIG. 1, another second speed reduction device 38 may be positioned between the second power transfer device 28 and the second wheel 18. For example and as shown in FIG. 1, another third speed reduction device 40 may be positioned between the second speed reduction device 38 and the second wheel 18.

For example and as shown in FIG. 1, another second speed reduction device 38 may be positioned between the second power transfer device 29 and the third wheel 20. For example and as shown in FIG. 1, another third speed reduction device 40 may be positioned between the second speed reduction device 38 and the third wheel 20. For example and as shown in FIG. 1, another second speed reduction device 38 may be positioned between the fourth power transfer device 30 and the fourth wheel 23. For example and as shown in FIG. 1, another third speed reduction device 40 may be positioned between the second speed reduction device 38 and the fourth wheel 23.

As shown in FIG. 1, the first braking mechanism 32 is positioned between the first power transfer device 24 and the first wheel 16 and the second braking mechanism 34 is positioned between the second power transfer device 28 and the second wheel 18.

For simplicity and as shown in FIG. 1, the vehicle 10 may include additional braking mechanisms that are similar or identical to other braking mechanisms. For example and as shown in FIG. 1, the third braking mechanism 35, which may be identical to first braking mechanism 32, may be positioned between the second power transfer device 29 and the first right wheel or third wheel 20. For example and as shown in FIG. 1, the fourth braking mechanism 37, which may be identical to second braking mechanism 34, may be positioned between the fourth power transfer device 30 and the second right wheel or fourth wheel 23.

As shown in FIG. 1, the second speed reduction device 38, the third. speed reduction device 40, the first braking mechanism 32 and the first wheel 16 combine to form first wheel drive assembly 41.

As shown in FIG. 1, other similar components combine to form first wheel drive assembly 41, second wheel drive assembly 42, third wheel drive assembly 44, and fourth wheel drive assembly 46.

Figure 2:
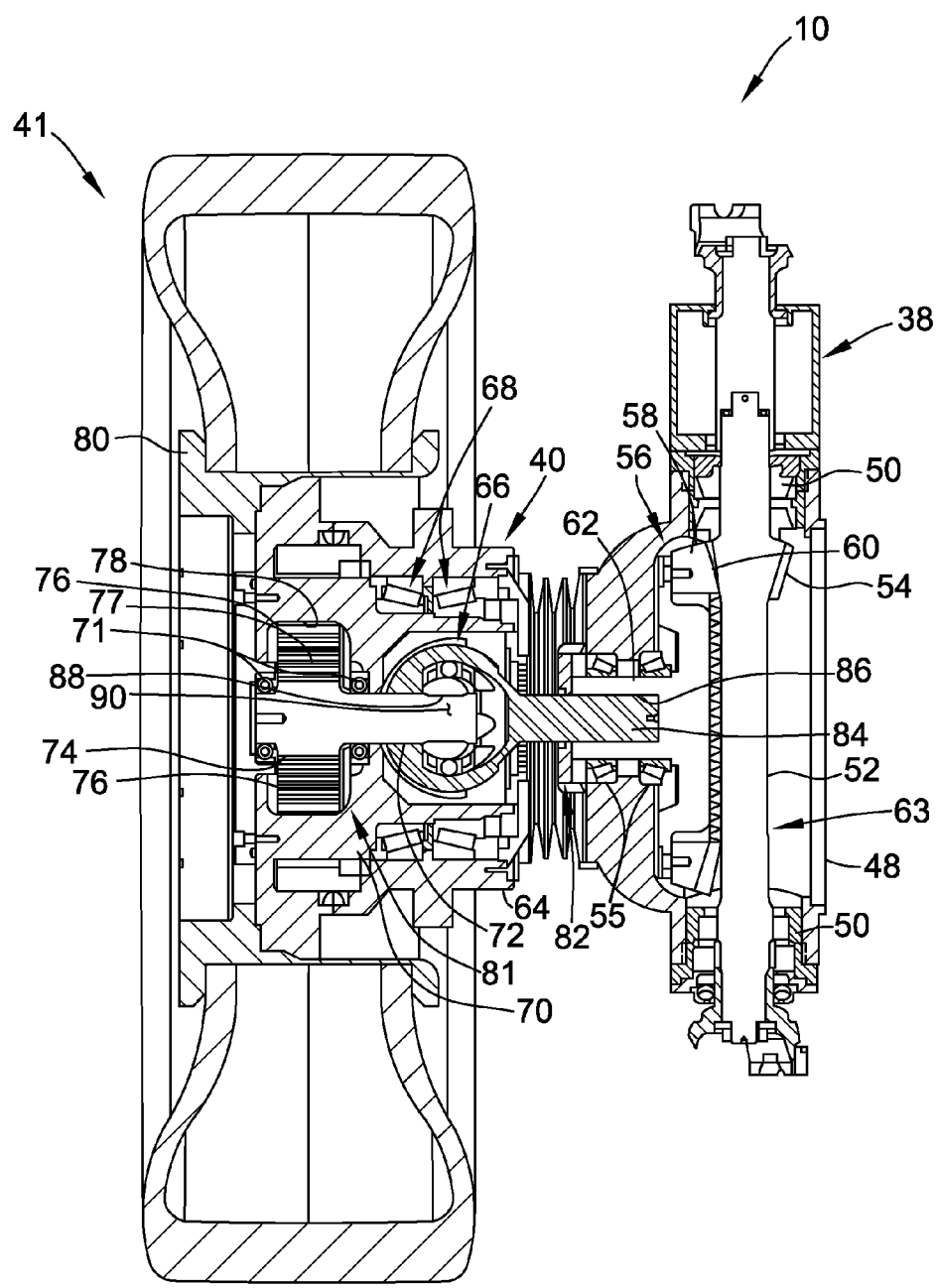
FIG. 2 is a top, partially cutaway, view of a front left wheel and drive assembly for use in the motorized vehicle of FIG. 1.

Referring now to FIG. 2, the first wheel drive assembly 41 is shown in greater detail. As shown in FIG. 2, the first wheel drive assembly 41 includes the second speed reduction device or first gearbox 38. While the first gearbox 38 may, for example, be a bevel gearbox, a spur gearbox, or a planetary gearbox, as shown in FIG. 2, the first gearbox 38 is a bevel gearbox.

The bevel gearbox 38 includes a bevel gearbox housing 48 that is secured to frame 8 (see FIG. 1). The housing 48 rotatably supports, with bearings 50, a pinion shaft 52 onto which a bevel pinion gear 54 is integrally formed. The housing 48 further rotatably supports, with bearings 55, a bevel crown gear 56. The bevel pinion gear 54 meshes with the bevel crown gear 56.

The crown gear 56 includes a cylindrical member 58 into which crown gear teeth 60 are formed and a tubular support shaft member 62 onto which the cylindrical member 58 is mounted. This multi-member construction greatly simplifies the fabrication of the crown gear 56 and reduces replacement component costs.

While the bevel pinion gear 54 and the bevel crown gear 56 may be lubricated in any suitable fashion, as shown in FIG. 2, a bevel gearbox oil sump 63 is formed within the bevel gearbox housing 48.

As shown in FIG. 2, the first wheel drive assembly 41 further includes a third speed reduction device or second gearbox 40. While the first gearbox 40 may, for example, be a bevel gearbox, a spur gearbox, or a planetary gearbox, as shown in FIG. 2, the second gearbox 40 is a planetary gearbox.

Figure 6:
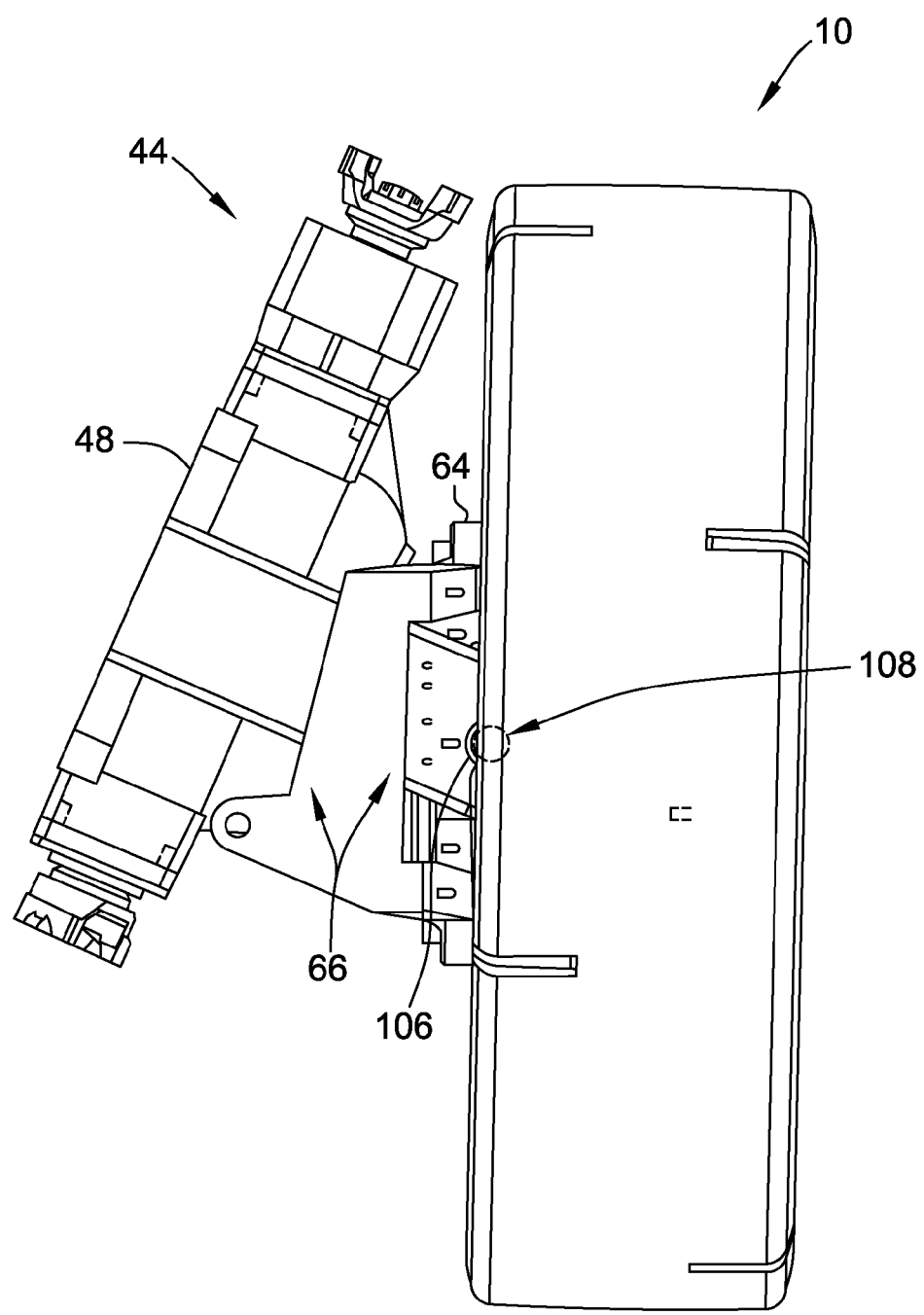
FIG. 6 is a top view of the front right wheel and drive assembly of FIG. 5 showing the front right wheel in a position for turning the vehicle.

The planetary gearbox 40 includes a planetary gearbox housing 64 that is rigidly secured to articulating mechanism 66 (see FIG. 6). The housing 64 rotatably supports, with bearings 68, a carrier 70. The carrier 70 supports with bearings 71 a sun gear shaft 72 onto which a sun gear 74 is formed. Pinion or planetary gears 76 are rotatably supported by journals 77 supported in carrier 70. The sun gear 74 meshes with planetary gears 76 and the planetary gears 76 mesh with an internal gear 78 rigidly secured to carrier 70. Wheel hub 80 is rigidly secured to carrier 70.

While the sun gear 74, the planetary gears 76 and the internal gear 78 may be lubricated in any suitable fashion, as shown in FIG. 2, a planetary gearbox oil sump 81 is formed within the planetary gearbox housing 64.

It should be appreciated that by providing the first gearbox 38 with a bevel gearbox housing 48 forming the bevel gearbox oil sump 63 and by providing the second gearbox 40 with a planetary gearbox housing 64 forming a planetary gearbox oil sump 81, the gearboxes 38 and 40 may be separately removed, repaired and reassembled making service simpler and less expensive. Further such a construction provides for saving to maintenance costs as simpler, less expensive, components can be stocked for service.

As shown in FIGS. 1-8, the vehicle 10 preferably has a steering feature. While such a steering feature may be accomplished by providing one or more articulating wheels, as shown the vehicle 10 has 4 articulating wheels. This articulation is provided by articulating mechanism 66 (see FIG. 6), providing articulation between the first gearbox 38 and the second gearbox 40. While such articulation can be provided by a variety of suitable mechanisms, as shown in FIG. 2, the vehicle 10 includes a constant velocity (CV) joint 82. The joint 82 includes a joint external spline 84 which mates with a flange member internal spline 86 formed in tubular support shaft member 62. The joint 82 further includes a joint internal spline 88 which mates with a sun gear shaft external spline 90 formed onto sun gear shaft 72.

Figure 3:
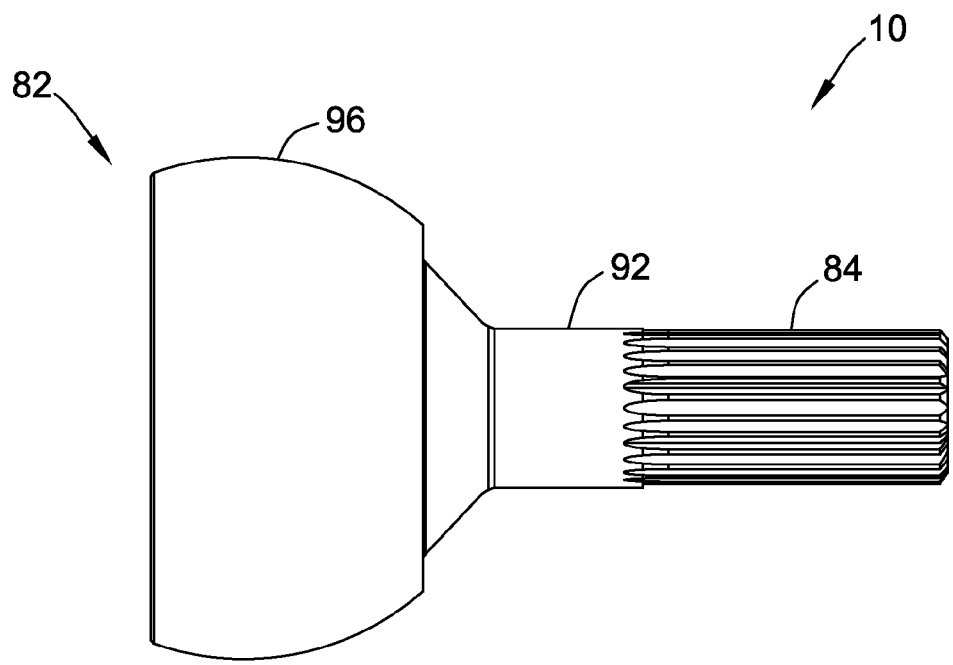
FIG. 3 is a plan view of a constant velocity joint tier the front left wheel and drive assembly of FIG. 2.
Figure 4:
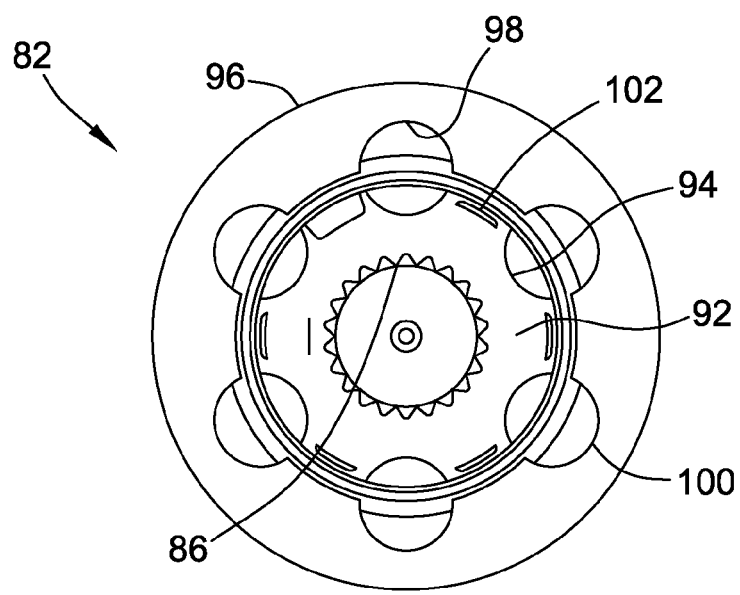
FIG. 4 is an end view of the constant velocity joint of FIG. 3.

As shown in FIGS. 3 and 4, the CV joint 82 includes a CV shaft 92 which includes an external ball race 94 and the CV joint external spline 84. The CV joint 82 also includes a CV outer housing 96 which includes an internal ball race 98 and the internal spline 86. The CV joint also includes bearing balls 100 that are contained by ball bearing cage 102. The bearing balls 100 roll or move within the internal ball race 94 and the external ball race 98. The CV joint may be lubricated in any suitable fashion and, for example, may be lubricated by grease (not shown).

Figure 5:
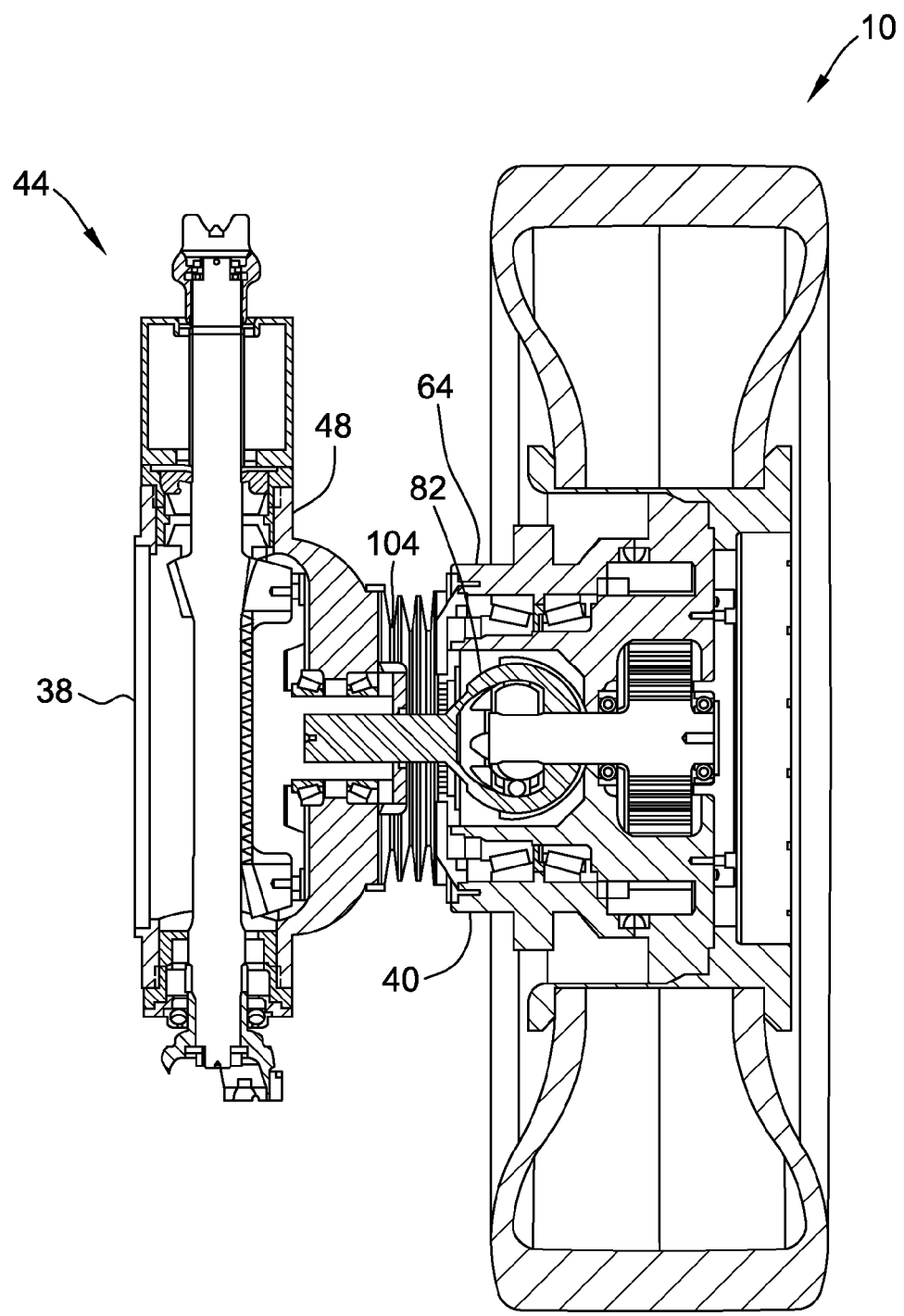
FIG. 5 is a top, partially cutaway, view of a front right wheel and drive assembly for use in the motorized vehicle of FIG. 1, with the speed reduction device of the right and left assemblies of FIGS. 2 and 5 having common components.

Referring now to FIGS. 5-8, the third wheel drive assembly 44 is shown in greater detail. As stated above, the third wheel drive assembly 44 may use similar or identical components to those used in first wheel drive assembly 40. For example and as shown in FIG. 5, the third wheel drive assembly 44 includes bevel gearbox 38 and planetary gearbox 40 articulatingly connected by CV joint 82.

To protect the CV joint 82 from contamination and as shown in FIG. 5, the third wheel drive assembly 44 may include a boot 104. The CV boot 104 may be positioned over CV joint 82. The boot 104 may be made of any suitable material, for example a rubber or a polymer and may be preformed into an accordion shape to provide some rigidity for all of its operating positions while the wheel drive assembly is articulating. The boot 104, as shown, is secured to bevel gearbox housing 48 and to planetary gearbox housing 64. The boot 104 is preferable easily secured to and removed from the bevel gearbox housing 48 and to planetary gearbox housing 64 to assist in removal of the bevel gearbox housing 48 and/or the planetary gearbox housing 64 during service. Hook and loop fasteners, snaps, magnets or other easily removable fasteners (not shown) can be used to secure boot 104 to housings 48 and 64.

Referring now to FIG. 6, the third wheel drive assembly 44 is shown in an articulated position to provide for turning the vehicle 10. The planetary gearbox housing 64 is articulatingly secured to the bevel gearbox housing 48 by the articulating mechanism 66. The articulating mechanism 66 may be any mechanism that provides articulation and may as shown be in the form of kingpin or pin 106 rotatably fitted into apertures in the form of cylindrical openings 108 in at least one of the bevel gearbox housing 48 and the planetary gearbox housing 64.

In an effort to minimize the number of different components in the vehicle 10 bevel gearbox 38 has been designed to be suitable for both the right wheel drive assemblies 44 and 46 and for the left wheel drive assemblies 41 and 42.

Figure 7:
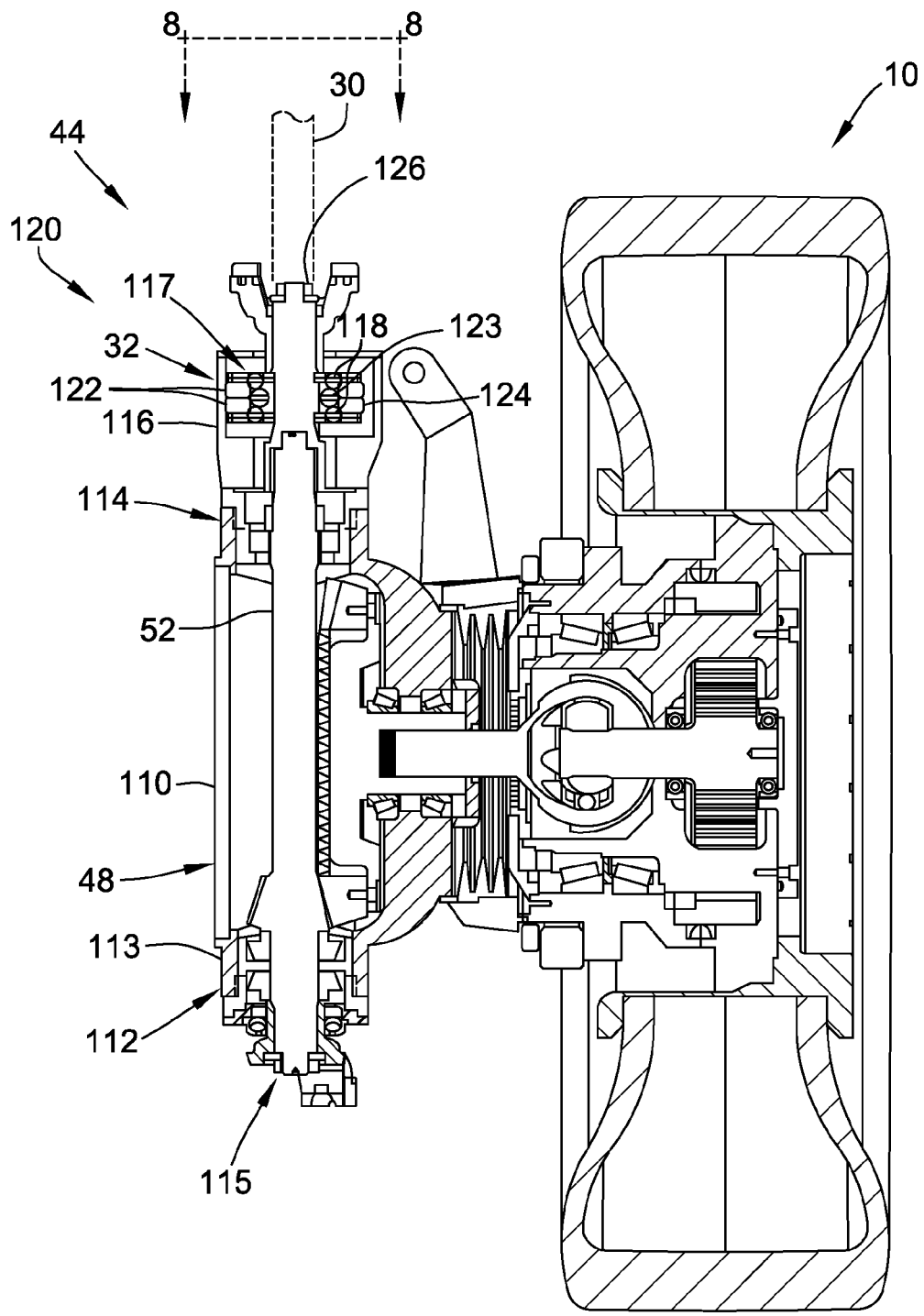
FIG. 7 is a top, partially cutaway, view of the front left wheel and drive assembly showing a first sump for a first speed reduction device and a second sump for a second speed reduction device.

Referring now to FIG. 7, making the gearbox 38 usable for all wheel drive assemblies may be accomplished by providing the bevel gearbox housing 48 with a central portion 110 and opposed first and second end portions 112 and 114, respectively. The first end portion 112 provides a housing 113 for first power transfer adapter 115 for connection to the corresponding power transfer device. The second end portion 114 includes a second end portion housing 116 for first braking mechanism or brake 32. The housing 116 includes a sump 117 for containing oil for the braking mechanism 32.

As can be seen by referring to FIGS. 2 and 7, the first and second end portions 112 and 114, respectively, can be easily removed from the central portion 110 of housing 48 in the configuration of FIG. 7. Then the first and second end portions 112 and 114, respectively, can be reinstalled on the opposite ends of the housing 48, creating the configuration of FIG. 2.

Figure 8:
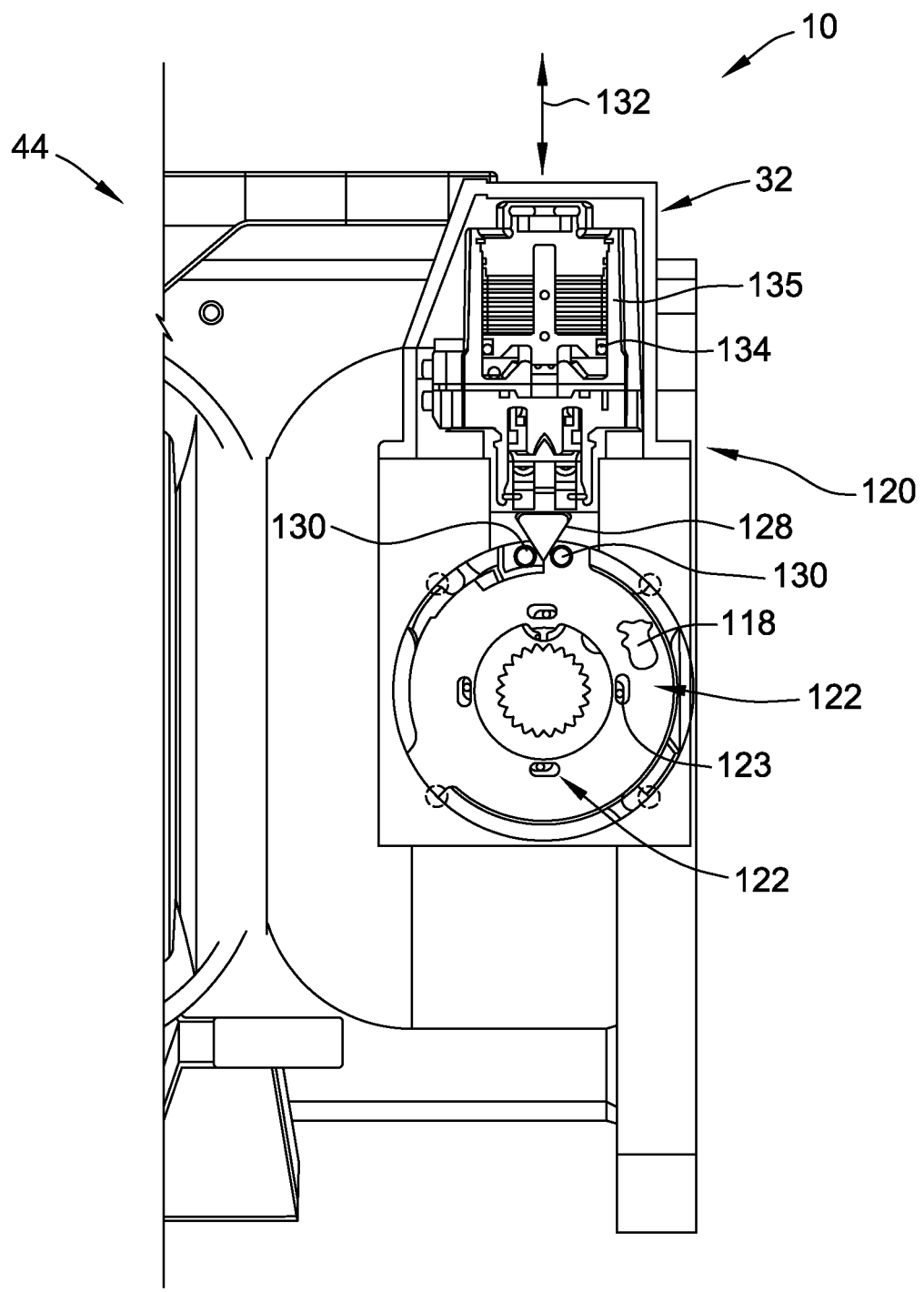
FIG. 8 is a front view, partially cutaway, of the wheel and drive assembly of FIG. 7 along the line 8-8 in the direction of the arrows showing a braking mechanism according to an aspect of the present invention.

Referring now to FIG. 8, while the braking mechanism 32 may be any mechanism for preventing rotation, for example the braking mechanism 32 may be a plate or disc type brake and may be a dry brake or may be a wet brake. If a wet brake, the brake may be an oil brake. As shown in FIGS. 7 and 8, the first braking mechanism 32 includes a plurality of plates or discs 118. The plates or discs 118 may be urged together by actuator 120 to provide the braking. As shown, the actuator 120 includes opposed ball ramp cylindrical members 122, which, when one member 122 rotates relative to the other, balls 123 urge at least one of the cylindrical members 122 toward the plates 118 engaging the brake 32. The actuator 120 includes a wedge member 128 which engages surfaces 130 of cylindrical members 122 to cause the members 122 to rotate. The wedge member 118 may be moved in the direction of arrows 132 by hydraulic piston 134 located in hydraulic piston cylinder 135. It should be appreciated that the plates 118 may be urged together and/or released by other mechanisms, for example, by wedges, levers, springs, cams or hydraulic cylinders (not shown).

Referring again to FIG. 7, a portion of the plates or discs 118 are rigidly connected to the second end portion 114 and a portion of the plates or discs 118 are rigidly connected to pinion shaft extension 126 connected to an end of pinion shaft 52. The pinion shaft extension 126 is connected to fourth power transfer adapter 30 for connection to the corresponding power transfer device. By connecting the brake to the pinion shaft, the torque that the brake must absorb is minimized, while still being able to provide individual braking for each wheel.

Figure 9:
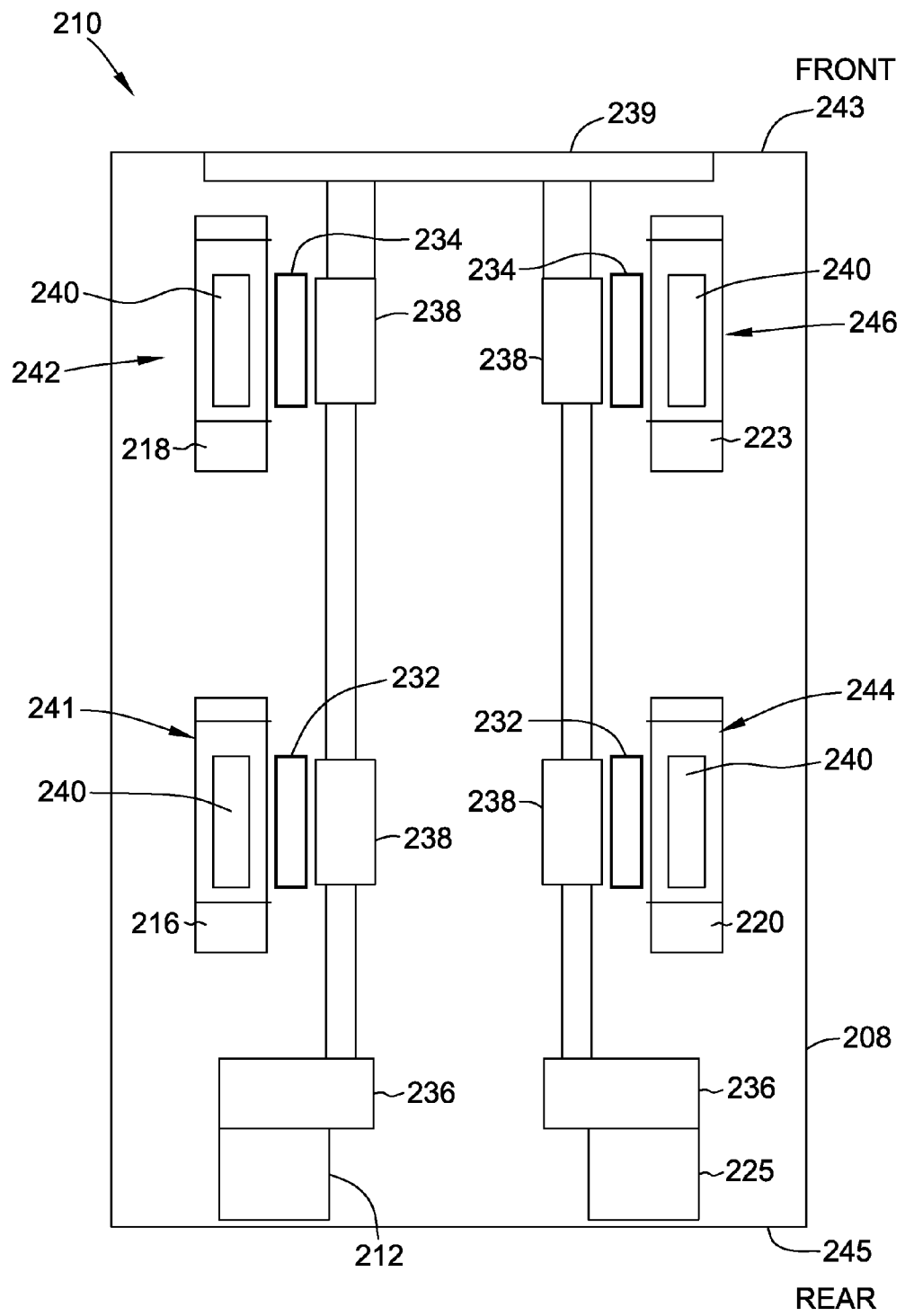
FIG. 9 is a top view of another embodiment of the present invention in the form of a motorized vehicle including separate braking mechanisms on the front and rear wheels with the separating brake mechanisms positioned between the first speed reduction device and the second speed reduction device.

Referring now to FIG. 9, an alternate embodiment of the present invention is shown as vehicle 210. The vehicle 210 is generally similar to vehicle 10 of FIGS. 1-8. The vehicle 210, as shown, includes four wheels 216, 218, 220 and 223. The wheels 216 and 218 are driven by wheel drive assemblies 241 and 242, respectively, and are powered by motor 212. The wheels 216 and 218 are mounted to frame 208. Similarly, the wheels 220 and 223 are driven by wheel drive assemblies 244 and 246, respectively, and are powered by motor 225. The motors 212 and 225 may be connected to first speed reduction devices 236 similar to first speed reduction devices 36 of the vehicle 10. The wheels 220 and 223 are mounted to frame 208. The wheel drive assemblies 241, 242, 244 and 246 are similar to wheel drive assemblies 41, 42, 44 and 46 of the vehicle 10 of FIGS. 1-8, except the wheel drive assemblies 241 & 242 and 244 & 246 include first and second brakes 232 and 234, respectively, that are positioned between bevel gearbox 238 and planetary gearbox 240. Generally the bevel gearbox 238 and the planetary gearbox 240 are similar to the bevel gearbox 38 and the planetary gearbox 40 of the vehicle 10 of FIGS. 1-8.

The wheel drive assemblies 241, 242, 244 and 246 are also different from the wheel drive assemblies 41, 42, 44 and 46 of the vehicle 10 of FIGS. 1-8 in that the brakes 232 and 234 have a different construction from that of the brakes 232 and 234 of the vehicle 10 of FIGS. 1-8.

The vehicle 210 may include an excavating or loading device 239, such as a cutter head 239. The cutter head 239 engages the material to be mined and is positioned on FRONT 243 of vehicle 210, opposed to the REAR 245 of vehicle 210.

Figure 10:
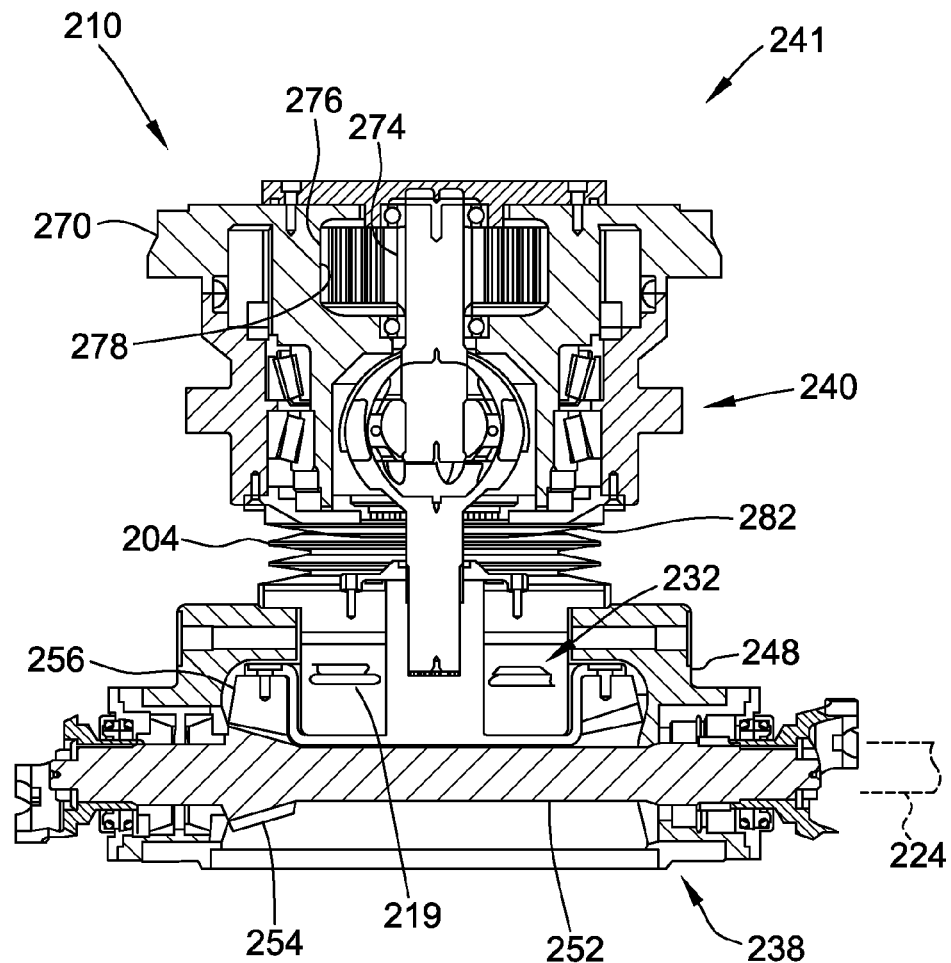
FIG. 10 is a top, partially cutaway, view of the wheel and drive assembly for use in the motorized vehicle of FIG. 9.

Referring now to FIG. 10, the first wheel drive assembly 241 of vehicle 210 is shown in greater detail. It should be appreciated that the second wheel drive assembly 212, the third wheel drive assembly 225 and the fourth wheel drive assembly 216 may be similar or identical to the first wheel drive assembly 241.

The first wheel drive assembly 241 includes bevel gearbox 238 and planetary gearbox 240. The bevel gearbox 238 is similar to bevel gearbox 38 of the vehicle 10 and includes a pinion shaft 252 similar to pinion shaft 52 of vehicle 10. The pinion shaft 252 is connected to first speed reduction device 236 by first power transfer device 224. The pinion shaft 252 includes a pinion gear 254 that meshes with crown gear 256. The crown gear is connected to CV joint 282 which is similar to CV joint 82 of the vehicle 10. A CV boot 204 similar to CV boot 104 of the vehicle 10, may be positioned over CV joint 282.

The CV joint 282 is connected to sun gear 274 which is mounted to carrier 270 of planetary gearbox 240. The sun gear 274 meshes with planetary gears 276, which are also mounted to carrier 270. The carrier 270 includes an internal gear 278 which also meshes with planetary gears 276.

As shown in FIG. 10, the first braking mechanism or brake 232 is located between the bevel gearbox 238 and the planetary gearbox 240. The braking mechanism 232 may be any mechanism for preventing rotation and may be similar or different from braking mechanism 32 of vehicle 10. For example, the braking mechanism 232 may be a plate or disc type brake and may be a dry brake or be a wet brake. If a wet brake, the brake may be an oil brake. As shown in FIG. 10, the first braking mechanism 232 includes a plurality of plates or discs 219 similar to plates or discs 118 of vehicle 10. The plates or discs 219 may be urged together by an actuator in the form of a spring (not shown) to provide the braking. A hydraulic piston (not shown) may be used to release the braking. It should be appreciated that the plates may be urged together and/or released by other mechanisms, for example, by wedges, levers, ball ramp mechanisms, cams or hydraulic cylinders (not shown).

As shown in FIG. 10, a portion of the plates or discs 219 are rigidly connected to the crown gear 256 and a portion of the plates or discs 219 are rigidly connected to bevel gearbox housing 248. The crown gear 256 forms the output of the bevel gearbox 238 and is connected to the planetary gearbox 240. By connecting the brake 232 to the planetary gearbox 240, the brake 232 may be located more closely to the wheels, providing more responsive braking, while still being able to provide individual braking for each wheel.

Figure 11:
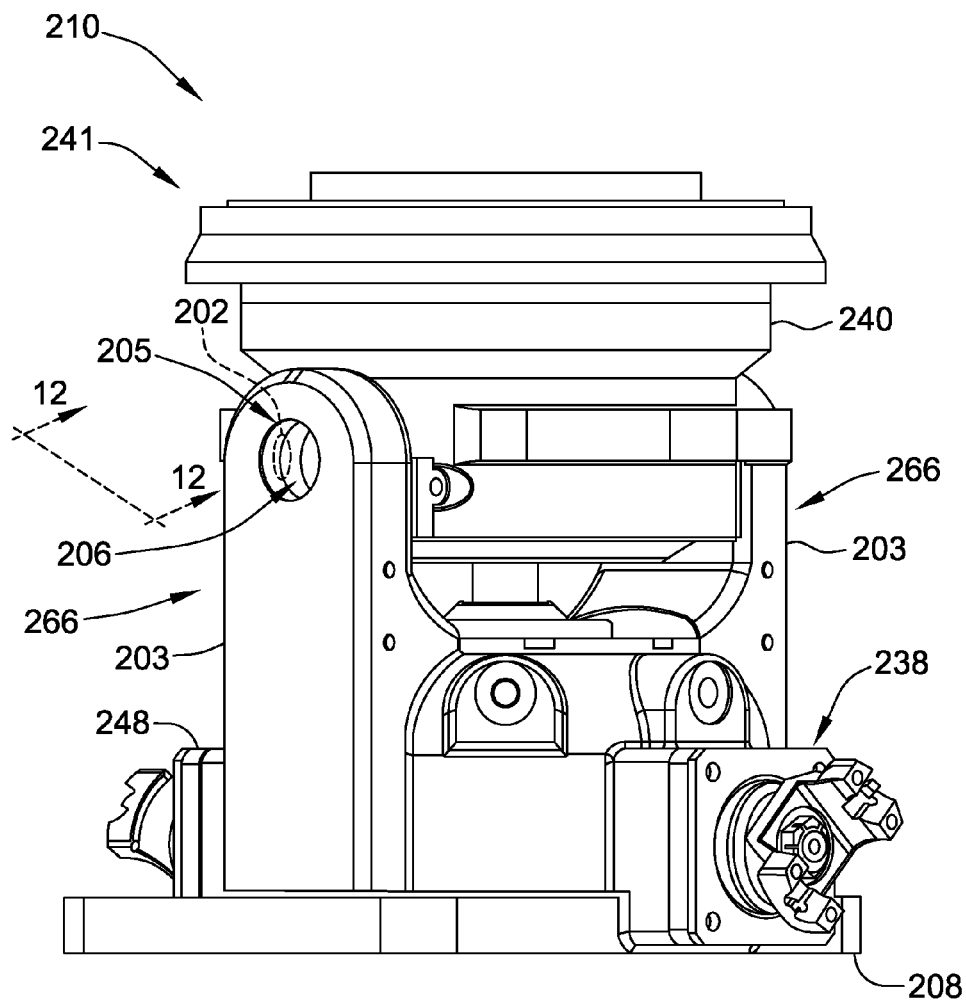
FIG. 11 is an oblique view of a wheel and drive assembly for use in the motorized vehicle of FIG. 9.
Figure 12:
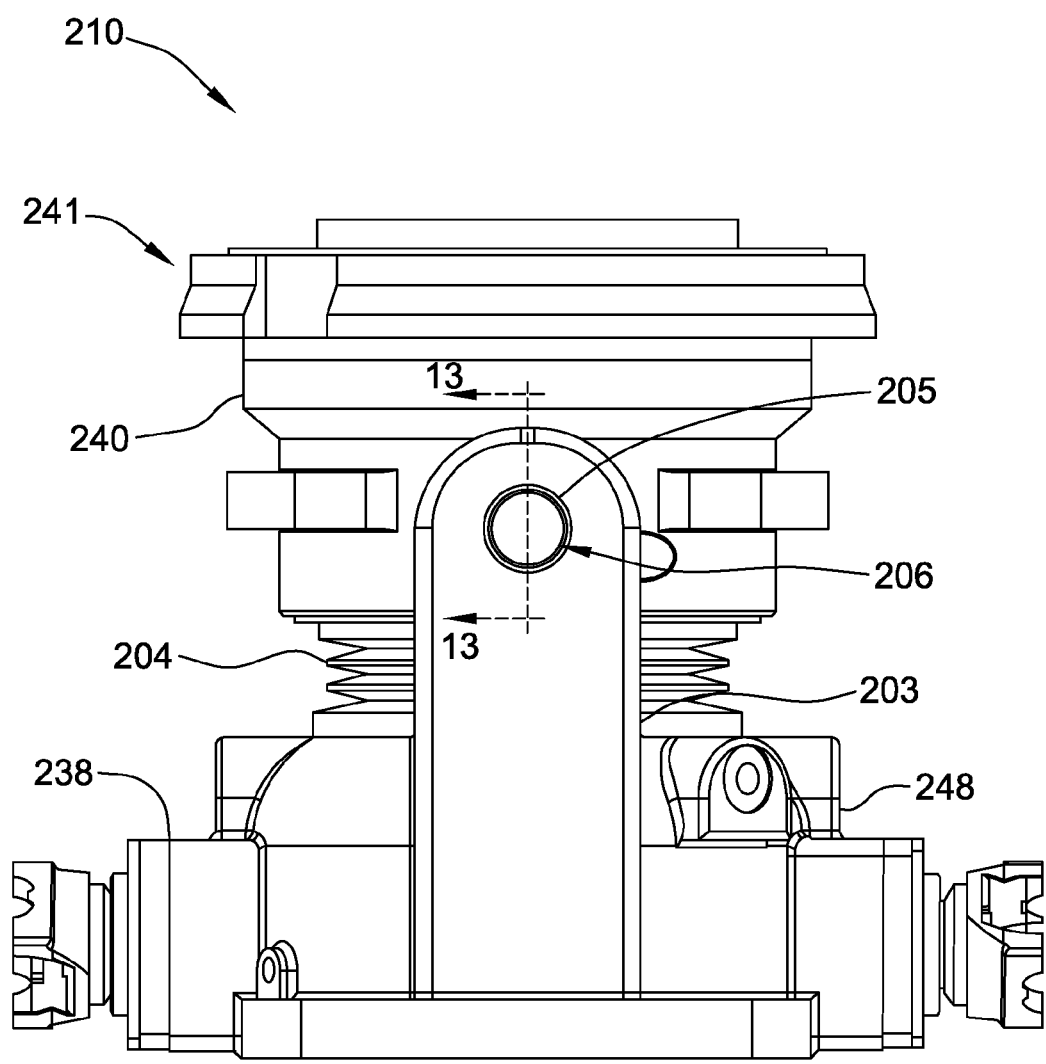
FIG. 12 is a top view of the wheel and drive assembly of FIG. 10 along the line 12-12 in the direction of the arrows showing a connection of a first speed reduction device to a second speed reduction device and a boot to prevent contamination of the drive.
Figure 13:
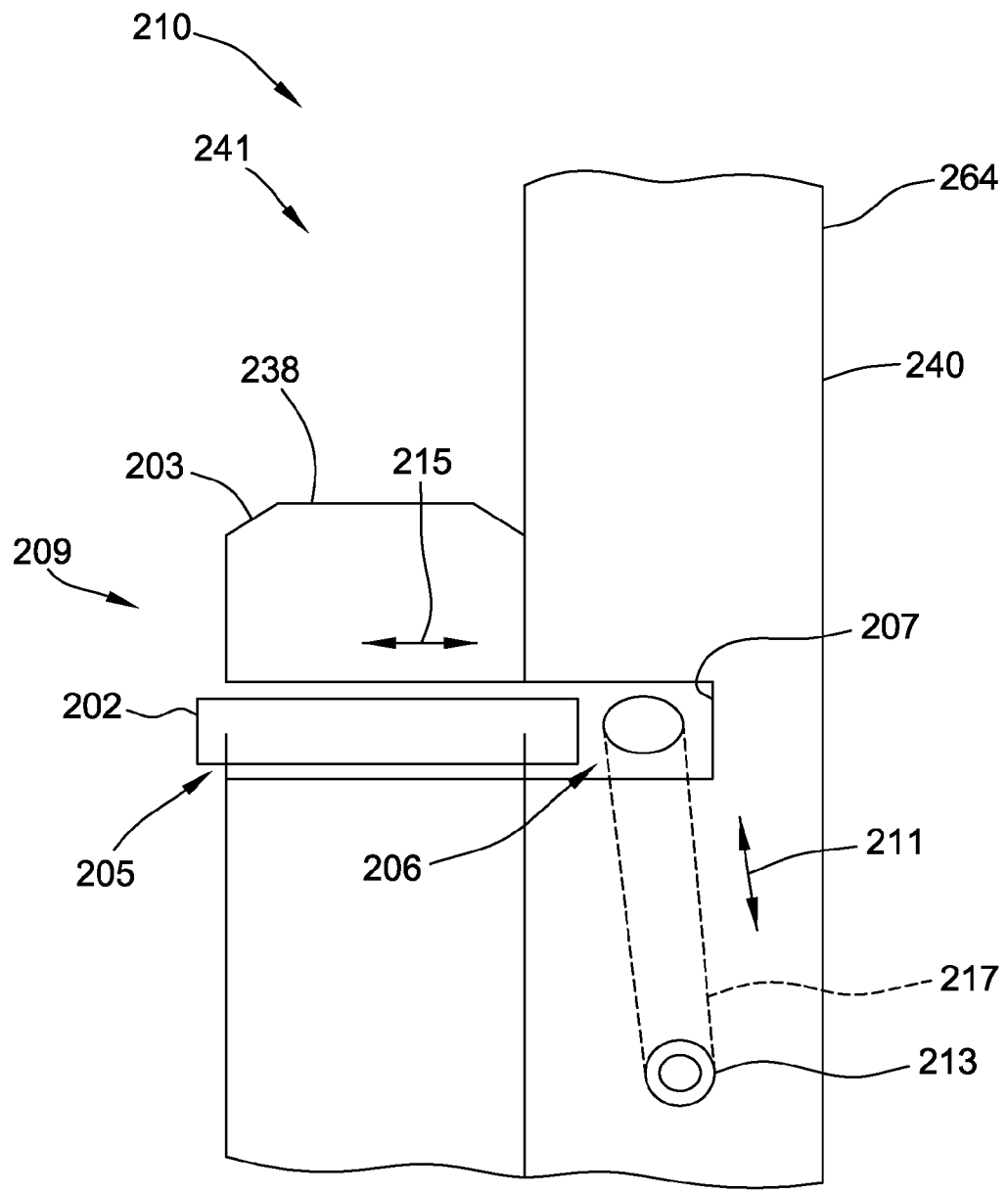
FIG. 13 is a partial view of the wheel and drive assembly of FIG. 12 along the line 13-13 in the direction of the arrows showing the kingpin and cavity in which it is positioned.

Referring now to FIGS. 11-13, the vehicle 210 includes an articulating mechanism 266, similar to articulating mechanism 66 of vehicle 10. The articulating mechanism 266 provides for turning the vehicle 210. The planetary gearbox 240 is articulatingly secured to the frame 208 at bevel gearbox housing 248 by the articulating mechanism 266. The planetary gearbox 240 and the bevel gearbox 238 are articulatingly connected by a kingpin or pins 202.

The articulating mechanism 266 may be any mechanism that provides articulation. As shown in FIGS. 11-13 and similar to mechanism 66 of vehicle 10, the articulating mechanism 266 may, as shown, be in the form of opposed arms 203 extending from bevel gearbox 238. Pins 202 are rotatably fitted into apertures or openings 205 in the form of cylindrical openings 206 in arms 203 of bevel gearbox housing 248 and in openings or apertures 206 in the planetary gearbox housing 264. As shown in FIGS. 11-13, the apertures 205 in arms 203 of bevel gearbox housing 248 are through openings while the openings 206 in planetary gearbox 240 are blind openings, having a back wall 207. Typically removing a pin from a blind hole may be problematic.

Referring now to FIG. 13 and according to an aspect of the invention, a pin disassembly tool 209 is incorporated into the vehicle 210. The pin disassembly tool 209 includes a grease path 211 for urging grease (not shown) within the grease path 211 from a grease fitting 213 positioned on planetary gearbox housing 264 of planetary gearbox 240 to openings 206 in planetary gearbox 240 between the pin 202 and the back wall 207. A grease path 211 is located in each of the two arms 203 of bevel gearbox 238. As grease is applied to openings 206 in planetary gearbox 240, the pins 202 in each of the two arms 203 are urged outwardly in the direction of arrows 215. A small movement of the pins 202 outwardly may be sufficient for a hand tool or other to device to attach to the pins 202 so that the pins 202 may be easily pulled completely from the openings 206 in the planetary gearbox 240. As shown, the grease path 211 may include a conduit 217 formed in planetary gearbox 240. Grease enters the grease paths 211 at grease fittings 213, moves along conduits 217 and eventually enters the openings 206 in planetary gearbox 240 between the pins 202 and the back wall 207. As grease is applied further into openings 206 in planetary gearbox 240, the pins 202 in each of the two arms 203 are urged outwardly in the direction of arrows 215 as required to facilitate the removal of the pins 202.

Figure 14:
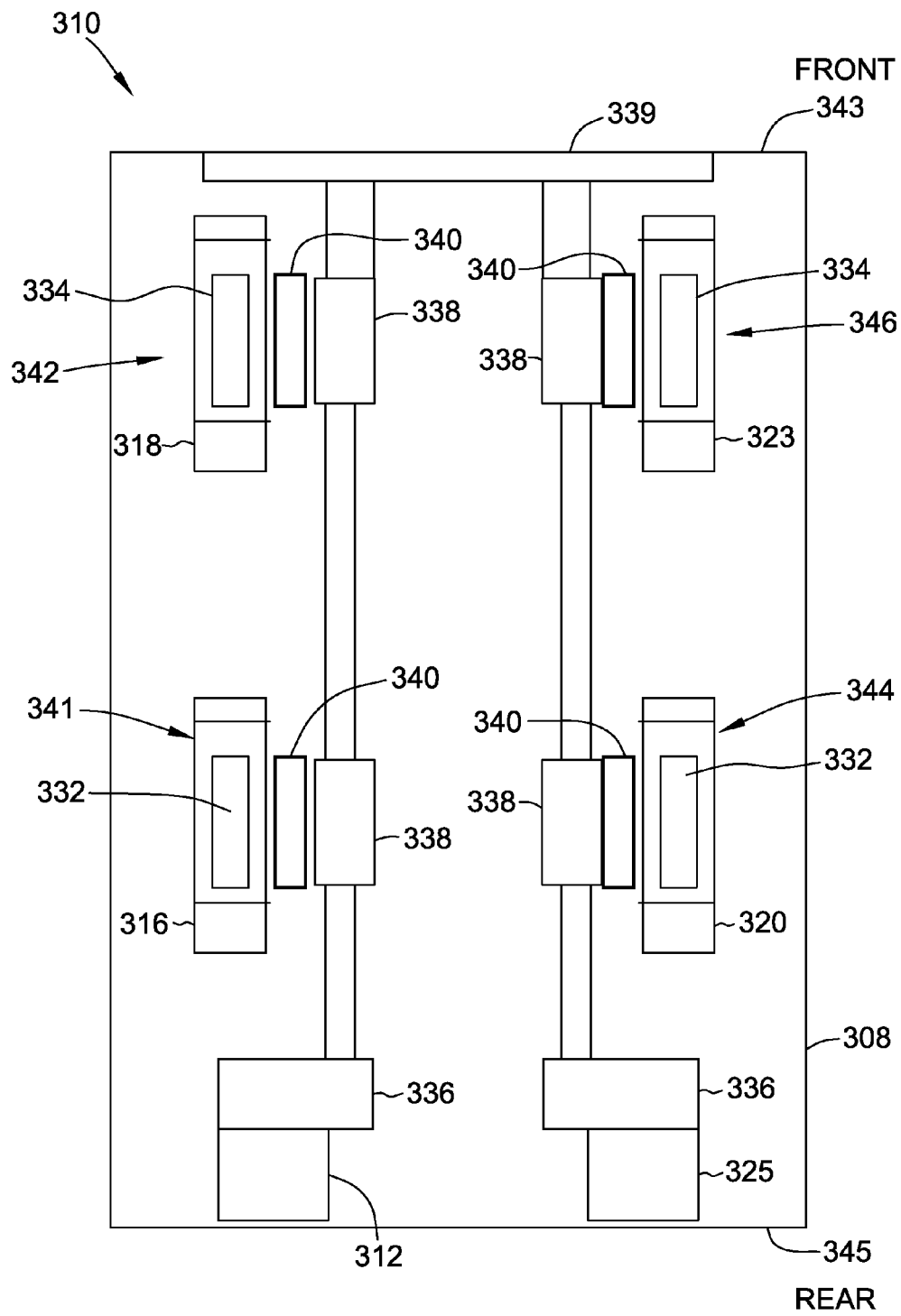
FIG. 14 is a top view of another embodiment of the present invention in the form of a motorized vehicle including separate braking mechanisms on the front and rear wheels with the separating brake mechanisms positioned between the second speed reduction device and the wheel.

Referring now to FIG. 14 and according to another embodiment of the invention, vehicle 310 is shown. The vehicle 310 is generally similar to vehicle 10 of FIGS. 1-8. The vehicle 310, as shown, includes four wheels 316, 318, 320 and 323. The wheels 316 and 318 are driven by wheel drive assemblies 341 and 342, respectively, and are powered by motor 312. The wheels 316 and 318 are mounted to frame 308. Similarly, the wheels 320 and 323 are driven by wheel drive assemblies 344 and 346, respectively, and are powered by motor 325. The motors 312 and 325 may be connected to first speed reduction devices 336 similar to first speed reduction devices 36 of the vehicle 10. The wheels 320 and 323 are mounted to frame 308. The wheel drive assemblies 341, 342, 344 and 346 are similar to wheel drive assemblies 41, 42, 44 and 46 of the vehicle 10 of FIGS. 1-8, except the wheel drive assemblies 341 & 342 and 344 & 346 include first and second brakes 332 and 334, respectively, that are positioned between output of planetary gearbox 340 and their respective wheels. Generally bevel gearbox 338 and the planetary gearbox 340 are similar to the bevel gearbox 38 and the planetary gearbox 40 of the vehicle 10 of FIGS. 1-8. The braking mechanism 332 and 334 may be similar or identical to each other.

The vehicle 310 may include an excavating or loading device 339, such as a cutter head 339. The cutter head 339 engages the material to be mined and is positioned on FRONT 343 of vehicle 210, opposed to the REAR 345 of vehicle 210.

The braking mechanisms, including the first braking mechanism 332, may be any mechanisms for preventing rotation and may be similar or different from braking mechanisms 32 of vehicle 10. For example, the first braking mechanism 332 may be a plate or disc type brake and may be a dry brake or be a wet brake. If a wet brake, the brake may be an oil brake. The first braking mechanism 332 may include a plurality of plates or discs (not shown) similar to plates or discs 118 of vehicle 10. The plates or discs may be urged together by an actuator (not shown) in the form of a spring (not shown) to provide the braking. A hydraulic piston (not shown) may be used to release the braking. It should be appreciated that the plates may be urged together and/or released by other mechanisms, for example, by wedges, levers, ball ramp mechanisms, cams or hydraulic cylinders (not shown). By connecting the braking mechanism 332 to the wheel 316, the braking mechanism 332 may be located more closely to the wheels, providing more responsive braking, while still being able to provide individual braking for each wheel.

Figure 15:
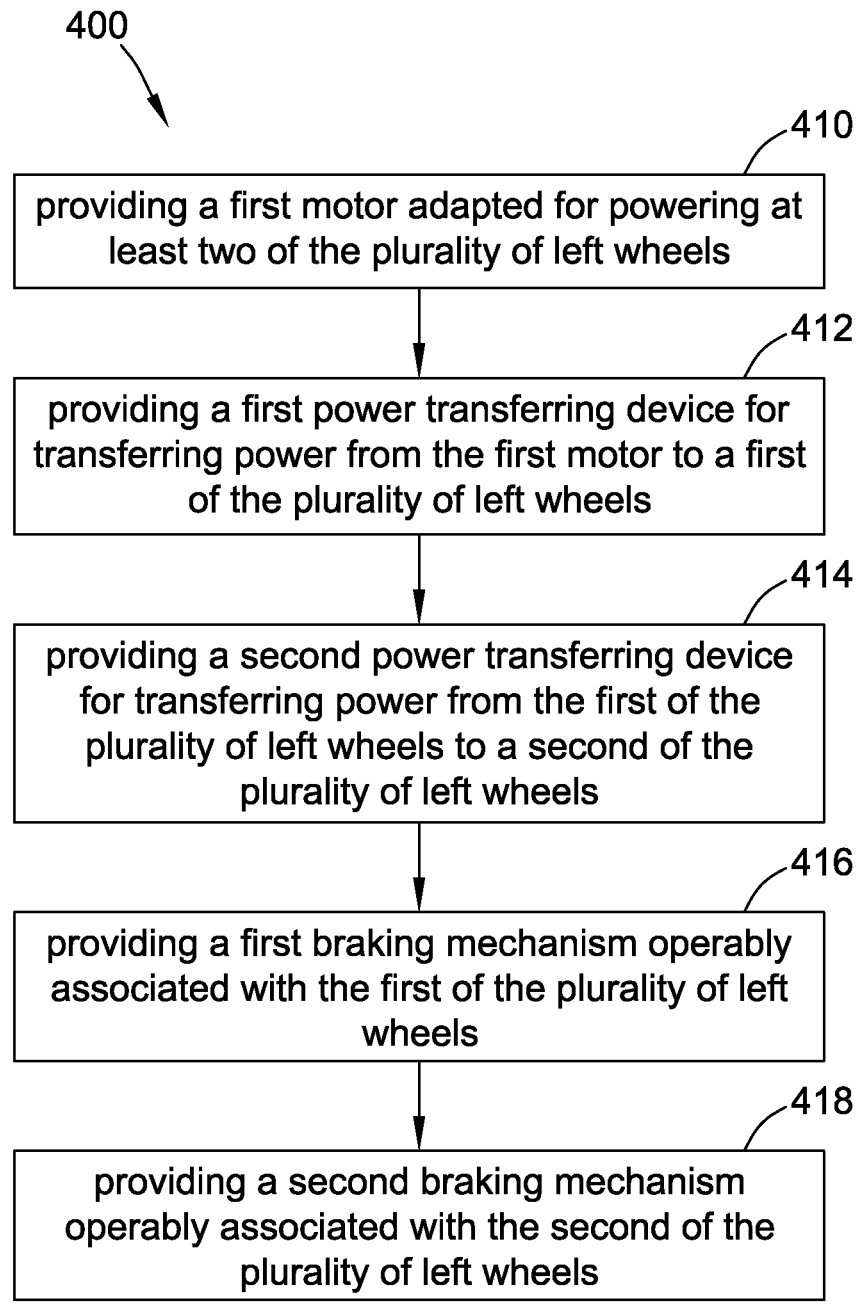
FIG. 15 is a flow chart of another exemplary method for providing a motorized vehicle according to another aspect of the present invention.

Referring now to FIG. 15 and according to another embodiment of the invention, a method 400 for powering motorized vehicle 10 (see FIG. 1) is shown. The vehicle 10 has a plurality of left wheels 16 and 18 and at least one right wheel 20. The method 400 includes step 410 of providing a first motor 12 (see FIG. 1) adapted for powering at least two of the plurality of left wheels 16 and 18 (see FIG. 1). The method 400 further includes step 412 of providing a first power transferring device 24 (see FIG. 1) for transferring power from the first motor 12 (see FIG. 1) to a first of the plurality of left wheels 16 and 18 (see FIG. 1).

The method 400 further includes step 414 of providing a second power transferring device 28 (see FIG. 1) for transferring power from the first wheel 16 (see FIG. 1) of the plurality of left wheels 16 and 18 (see FIG. 1) to a second wheel 18 (see FIG. 1) of the plurality of left wheels 16 and 18 (see FIG. 1).

The method 400 further includes step 416 of providing a first braking mechanism 38 (see FIG. 1) operably associated with the first wheel 16 (see FIG. 1) of the plurality of left wheels and step 418 of providing a second braking mechanism 40 (see FIG. 1) operably associated with the second wheel 18 (see FIG. 1) of the plurality of left wheels.

Referring again to FIG. 15 the method 400 may further include the step (not shown) of providing a first right wheel 20 (see FIG. 1), the step (not shown) of providing a second right wheel 23 (see FIG. 1) and the step (not shown) of providing a second motor 25 (see FIG. 1) adapted for powering the first right wheel 20 (see FIG. 1) and the second right wheel 23 (see FIG. 1).

The method 400 may further include the step (not shown) of providing a third power transferring device 29 (see FIG. 1) for transferring power from the second motor 25 (see FIG. 1) to a first of the plurality of right wheels 23 (see FIG. 1) and the step (not shown) of providing a fourth power transferring device 30 (see FIG. 1) for transferring power from the first 20 (see FIG. 1) of the plurality of right wheels to a second 23 (see FIG. 1) of the plurality of right wheels.

When introducing elements/components/etc. of the methods and apparatus described and/or illustrated herein, the articles "a", "an", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet motor that reduces or eliminates the efficiency loss caused by the lower cost material. Furthermore, the exemplary methods system and apparatus achieve increased efficiency while reducing or eliminating an increase of the length of the motor. The methods, system and apparatus described herein may be used in any suitable application. However, they are particularly suited for HVAC and pump applications.

Exemplary embodiments of the fluid flow device and system are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motorized vehicle, the vehicle having a plurality of left wheels and a plurality of right wheels, the vehicle comprising: a first motor adapted for powering at least two of the plurality of left wheels; a second motor adapted for powering at least two of the plurality of right wheels; a first power transferring device for transferring power from the first motor to a first of the plurality of left wheels; a second power transferring device for transferring power from the second motor to a first of the plurality of right wheels; a third power transferring device for transferring power from the first of the plurality of left wheels to a second of the plurality of left wheels; a fourth power transferring device for transferring power from the first of the plurality of right wheels to a second of the plurality of right wheels; a first braking mechanism operably associated with the first of the plurality of left wheels; and a second braking mechanism operably associated with the second of the plurality of left wheels, further comprising a first speed reduction device positioned between the first power transferring device and the first of the plurality of left wheels; and wherein the first speed reduction device includes a housing, an adapter mounted to the housing, and a crown gear mounted to the adapter.

2. A motorized vehicle, the vehicle having a plurality of left wheels and a plurality of right wheels, the vehicle comprising: a first motor adapted for powering at least two of the plurality of left wheels; a second motor adapted for powering at least two of the plurality of right wheels; a first power transferring device for transferring power from the first motor to a first of the plurality of left wheels; a second power transferring device for transferring power from the second motor to a first of the plurality of right wheels; a third power transferring device for transferring power from the first of the plurality of left wheels to a second of the plurality of left wheels; a fourth power transferring device for transferring power from the first of the plurality of right wheels to a second of the plurality of right wheels; a first braking mechanism operably associated with the first of the plurality of left wheels; and a second braking mechanism operably associated with the second of the plurality of left wheels, further comprising a first speed reduction device positioned between the first power transferring device and the first of the plurality of left wheels; further comprising a second speed reduction device positioned between the first speed reduction device and the first of the plurality of left wheels.

3. The motorized vehicle of claim 1, wherein the first braking mechanism is positioned between the first speed reduction device and the second speed reduction device.

4. The motorized vehicle of claim 1, wherein the first braking mechanism is positioned between the second speed reduction device and the first of the plurality of left wheels.

5. The motorized vehicle of claim 1, further comprising a kingpin operably connected to at least one of the first speed reduction device and second speed reduction device, at least one the first speed reduction device and second speed reduction device defining a cavity for receiving at least a portion of the kingpin, the cavity defining a chamber for containing a fluid for assisting in moving the kingpin from a locked position to an unlocked position.

6. A motorized vehicle, the vehicle having a plurality of left wheels and a plurality of right wheels, the vehicle comprising: a first motor adapted for powering at least two of the plurality of left wheels; a second motor adapted for powering at least two of the plurality of right wheels; a first power transferring device for transferring power from the first motor to a first of the plurality of left wheels; a second power transferring device for transferring power from the second motor to a first of the plurality of right wheels; a third power transferring device for transferring power from the first of the plurality of left wheels to a second of the plurality of left wheels; a fourth power transferring device for transferring power from the first of the plurality of right wheels to a second of the plurality of right wheels; a first braking mechanism operably associated with the first of the plurality of left wheels; and a second braking mechanism operably associated with the second of the plurality of left wheels, further comprising: a first speed reduction device operably associated with a first of the plurality of left wheels; a second speed reduction device positioned between the first speed reduction device and the first of the plurality of left wheels; a first sump operably associated with the first speed reduction device; and a second sump operably associated with the second speed reduction device.

* * * * *